Feb. 18, 1930.   T. L. ROBINSON   1,747,736
CAGE FOR ANTIFRICTION BEARINGS
Filed Aug. 23, 1926

Inventor
THOMAS L. ROBINSON
By
Attorney

Patented Feb. 18, 1930

1,747,736

UNITED STATES PATENT OFFICE

THOMAS L. ROBINSON, OF VALPARAISO, INDIANA

CAGE FOR ANTIFRICTION BEARINGS

Application filed August 23, 1926. Serial No. 131,060.

The invention relates to ball spacing cages for bearings of the annular type, which are interposed between the outer and inner raceways for the purpose of keeping the balls in proper spaced relation, and particularly to a cage that can be employed in either a single or double row annular ball bearing.

There are many types of cages for this purpose made in various manners, materials and number of pieces. In all such constructions, pockets or chambers are provided which partially surround the balls, contacting at various points on the surface of the balls. In some instances cages are made in two pieces and riveted together after being assembled in the bearing. The two piece type of cage lends itself quite readily to assembly in a single row bearing, but becomes difficult to assemble in a double row bearing where the space between the two rows of balls is inaccessible and two distinct cages are necessary.

My invention contemplates a one piece cage that can be stamped out of sheet metal or completely die cast in one operation, and that can be employed in either a single or double row bearing. Its assembly in the bearing is extremely simple and the balls can be all locked in place by a single operation in a simple press whether the assembly is being made in a single row or a double row bearing. In the absence of a press, the locking can be accomplished by hand with such simple tools as a hammer and a punch. Furthermore in field service where far removed from special tool equipment, the bearing can be disassembled by hand using a hammer and punch. This is particularly useful as when necessary a cracked ball can be removed, a new ball substituted and a new cage installed without the necessity of specially prepared devices or tools.

With the above and other objects in view, my invention consists of the arrangement, combination and construction of the various elements of my improved device as described in the specification, claimed in my claims and shown in the accompanying drawings, in which:

Figure 2:
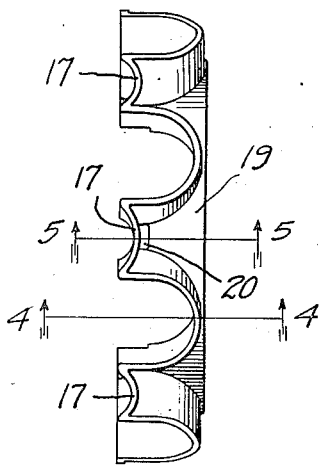
Fig. 2 is an edgewise view of an unlocked cage ready for assembly.
Figure 3:
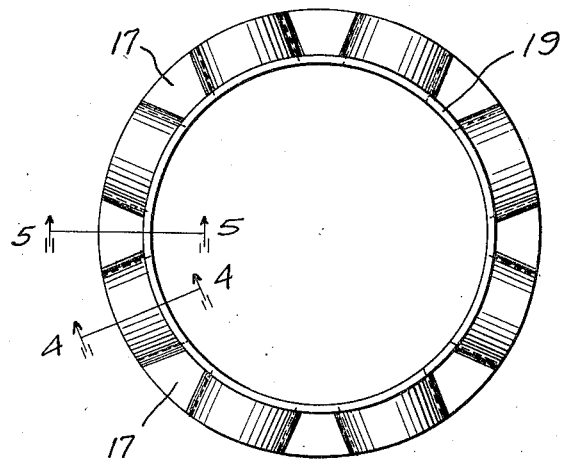
Fig. 3 is a side or flat view of the cage by itself.
Figure 1:
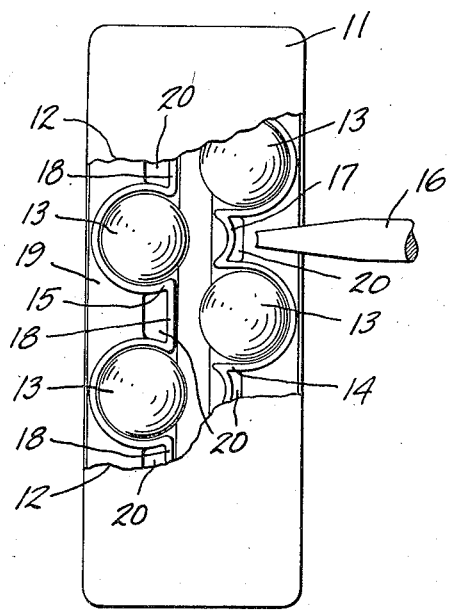
Fig. 1 depicts a double row bearing with the outer raceway partially removed to disclose some of the balls, a locked and an unlocked cage.
Figure 4:
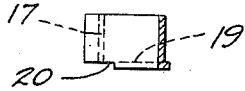
Fig. 4 is a section taken on the line 4—4 of Fig. 2 or Fig. 3.
Figure 5:
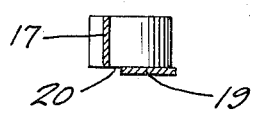
Fig. 5 is a section taken on the line 5—5 of Fig. 2 or Fig. 3.

In the drawings 11 is the outer raceway of a double row annular ball bearing partially cut away at 12—12 disclosing several of the balls 13. 14 indicates an embodiment of my cage just as it is inserted between the raceways and before the locking operation has been performed. 15 depicts the shape of the cage after the locking operation has been performed by the locking tool or punch 16.

The partition, wall or link 17 between adjacent ball pocket walls is originally made curved in form, the linear dimension of this curved link 17 being sufficient to cause the ball pocket walls to be bent in against the balls and lock them in place when the link 17 is made straight or flat by pressure or blows from the tool 16. In quantity manufacture, this operation is performed in a punch press with a gang of punches in one fixture, one punch for each interpocket space in each cage. This means that for a double row bearing having ten balls in each groove, the gang would have ten punches in the upper fixture and ten in the lower fixture and closing the press once would lock all of the balls in place by straightening out the twenty interpocket links or partitions simultaneously.

When the curved interpocket link 17 has been straightened out by means of the tool 16, it assumes the form of a straight wall or link 18. It will be noted that as originally provided the links 17 are recessed to extend backwardly between the walls of the pockets so that when said links are straightened out the ends of said walls are forced apart by the toggle action of said links and the balls thereby retained in said pockets. This arrangement constitutes a positive one for the purpose and one which automatically locks the balls in retained positions. The base ring 19 terminates at or near the plane of the ball centers leaving the openings 20, so that the portions of the ball pocket walls toward the center of the bearing (measured axially) are unsupported by the ring 19 and can be bent in against the balls 13 when the interpocket links 17 are straightened into the form 18. It is also to be noted that by this arrangement the links 17 are connected with the base member only by their connections with the walls of the ball pockets so that there will be no distortion of the base member when the links are straightened out.

It will be seen that my entire cage is made in one piece, and can be made a sheet metal stamping or preferably in a metal mold in a single die casting operation. It will be evident that my cage will serve and easily assemble in either a single or double row bearing with equal facility. The operation of straightening the interpocket link 17 into the form 18 would require only one gang punch fixture in the case of a single row bearing, the raceways resting on a flat table instead of a gang punch fixture.

In my construction it will be noted that the walls of the ball pockets as carried in beyond the center of the balls and joining the interpocket links 17 (18), makes for a very strong structure, leaving nothing resembling flaps, ears or fingers to break off and ruin a cage and perhaps a whole bearing. It will be noted that no part of my cage can become a loose piece by breaking through a single wall anywhere. In order to drop a loose piece of my cage into a bearing, two walls would have to be broken through thus making my structure twice as strong as those constructions employing flaps, ears or fingers.

Should it become necessary to tear down a bearing equipped with my cage at a place where special tools were not available, a hand punch such as 16 could be placed against the flat wall or link 18, and the punch struck with a hammer until the link 18 was bent down and drew the ball pocket walls apart sufficiently to release the cage. This of course would destroy the cage, but the operation is quick, simple and cheap and requires no special tools. The removal of the cage permits the replacement of damaged balls followed by the insertion of a new cage, whereupon the link 17 can be bent down into the form 18 by using the same hammer and punch, yet permitting an accurate assembly.

It will now be apparent that I have devised a new and useful construction in a very simple manner. Obviously changes in detail can be made by anyone skillful in the art without departing from the spirit of the invention, and I do not care to limit myself to any particular arrangement of these elements.

What I claim is:

1. A spacing cage for ball bearings comprising a single substantially cylindrical base ring, ball pockets provided with openings in their lateral sides initially proportioned to permit the passage of balls therethrough into said ball pockets, the full depth of said ball pockets in axial planes of the base ring being greater than the radii of the balls, and bendable deformed links which connect the adjacent edges of the openings in the walls of adjacent ball pockets, the relation being such that when said links are straightened sufficiently, they will exert a toggle action on the walls of the ball pockets connected thereby, respectively, and will bend the same around balls contained in said pockets, and the relation being such also that the width of the openings in the sides of the ball pockets of the finished cage will be less than the diameter of the balls.

2. A spacing cage for ball bearings as specified in claim 1, in which the base ring has a clear diameter proportioned to fit a bearing member with slight clearance.

3. A spacing cage as specified in claim 1, in which the deformation of the links which connect the adjacent edges of the openings in the walls of adjacent ball pockets is in the direction of the closed sides of said ball pockets.

4. A spacing cage as specified in claim 1, in which the proximate edges of the base ring and links which connect the walls of adjacent ball pockets are spaced apart.

THOMAS L. ROBINSON.